United States Patent Office 3,538,412
Patented Nov. 3, 1970

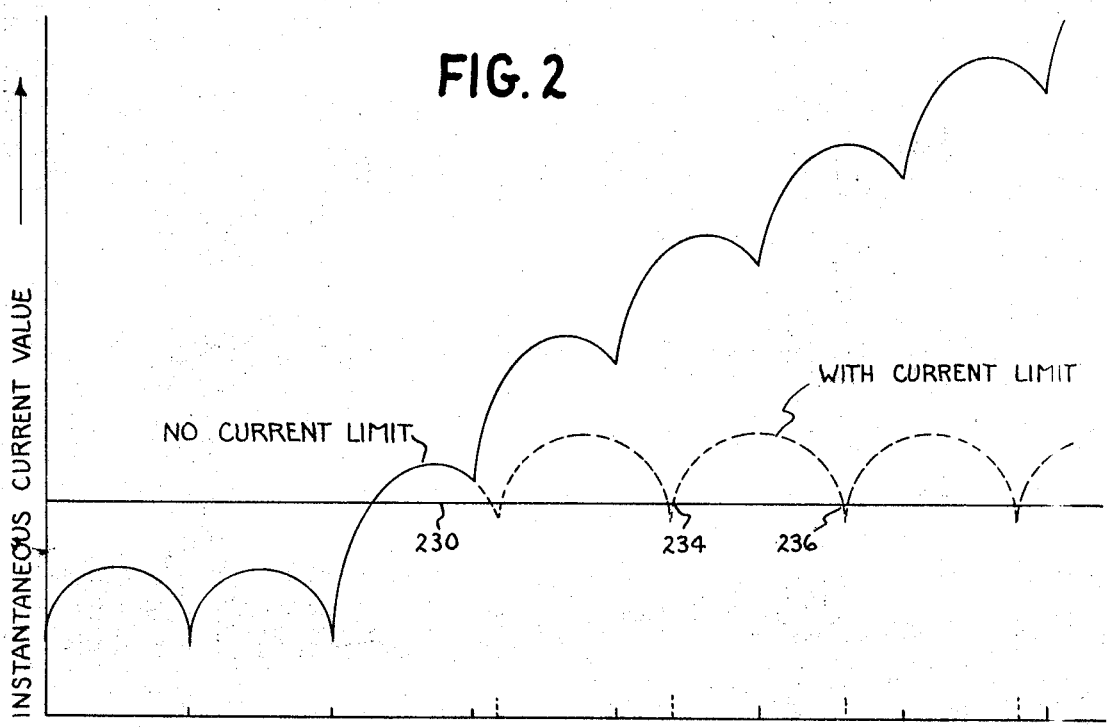
FIG. 2
FIG. 2A
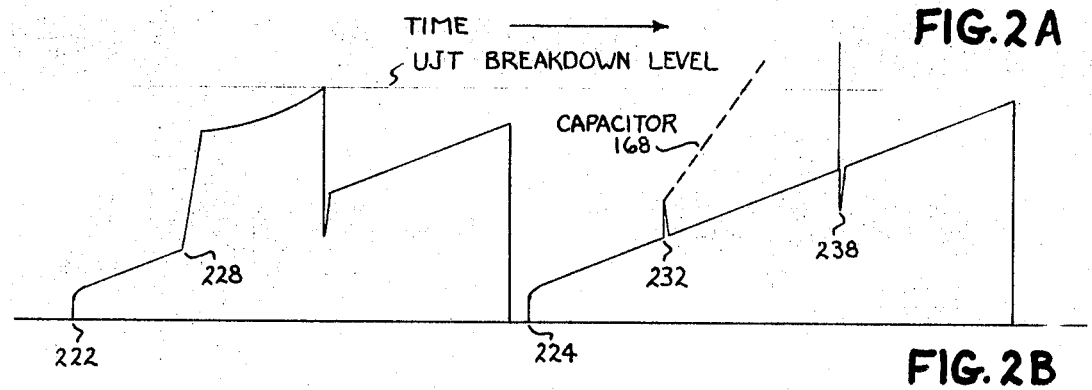
FIG. 2B
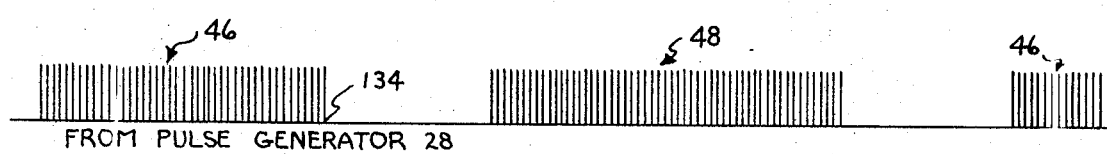
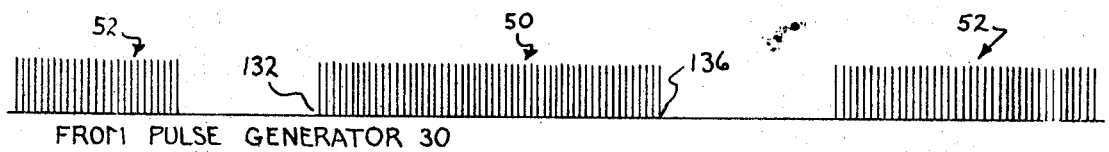
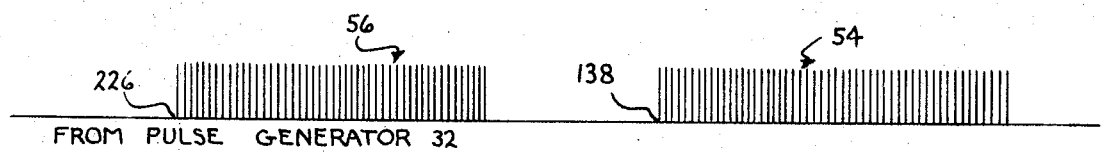
FIG. 2C

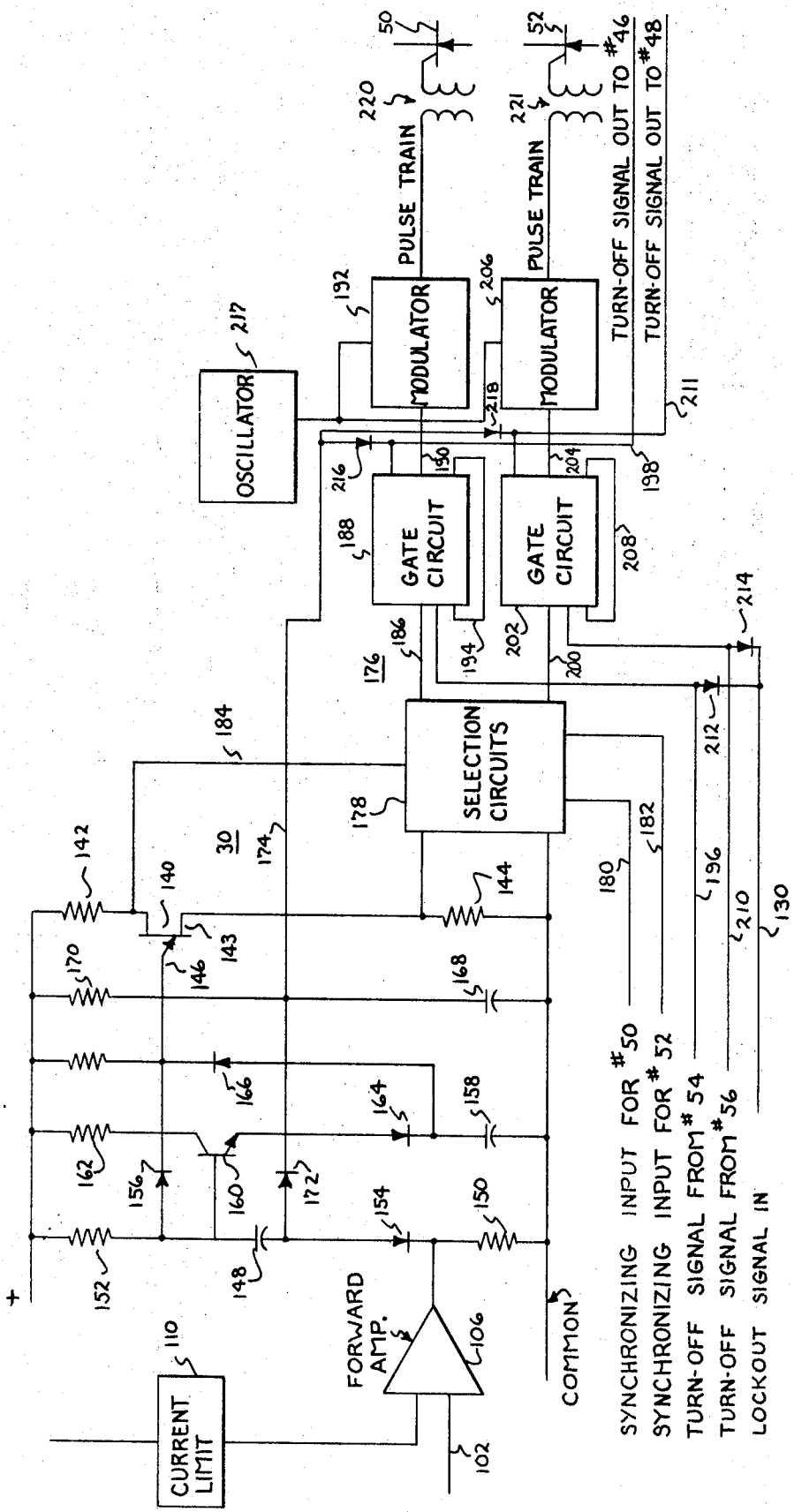

3,538,412
MOTOR CONTROL SYSTEM WITH THREE
PHASE CONVERSION
Carlton E. Graf and Henry J. Havlicek, Erie, Pa., assignors to General Electric Company, a corporation of New York
Continuation of application Ser. No. 676,778, Oct. 20, 1967. This application May 5, 1969, Ser. No. 824,732
Int. Cl. H02p 5/12
U.S. Cl. 318—345                                           16 Claims

ABSTRACT OF THE DISCLOSURE

A regenerative, reversible motor control system in which a direct-current drive motor is energized by a phase controlled power amplifier having controlled rectifiers which are connected to a three phase alternating-current source. Each of the controlled rectifiers is fired by a train of pulses which begins at the phase angle at which this controlled rectifier is to be fired and lasts until a selected one of the other of the controlled rectifiers is fired, approximately 120 electrical degrees later. In the three-phase, full-wave bridge circuit shown, each pair of controlled rectifiers connected to one line of the source is fired by a single pulse generator. When one of this pair of controlled rectifiers is being fired, the pulse generator cannot provide firing pulses for the other, thus protecting against any more than a 60° phase advance during any half-cycle of the source voltage.

---

This is a continuation of application Ser. No. 676,778, filed Oct. 20, 1967, and now abandoned.

This invention relates to motor control systems, and more particularly, to motor control systems using phase controlled power amplifiers to apply electrical energy from a three-phase, alternating-current source to a drive motor.

It is an object of this invention to provide a motor control system in which controlled rectifiers coupling current from a three-phase alternating-current source in a phase controlled power amplifier continue to conduct after they are fired, in spite of transient source voltage conditions which temporarily decrease the voltage across the controlled rectifiers.

It is another object of this invention to provide a reversible motor control system in which the firing circuits for controlled rectifiers in a three-phase, full-wave bridge circuit prevent controlled rectifiers in this circuit from being fired out of sequence.

SUMMARY OF INVENTION

Briefly stated, and in accordance with one aspect of this invention, a motor control system is energized by electrical energy coupled through controlled rectifiers connected to each line of a three-phase alternating-current source. Pulse generators for the system first apply a train of firing pulses to each of the controlled rectifiers at a phase angle determined by a regulator for the system. Each of the pulse generators is turned off, allowing an associated controlled rectifier to be commutated, by a signal coupled from a selected one of the other pulse generators when the selected pulse generator is first turned on.

The novel features of this invention are set forth with particularity in the appended claims. The organization and manner of operation of the invention, together with further objects and advantages thereof, can be best understood by referring to the following description, taken in conjunction with the accompanying drawings.

BRIEF DESCRIPTION OF DRAWINGS

FIGS. 2, 2A, 2B and 2C are graphs showing wave diagrams of the current and voltages present at various points of the motor control system;

FIG. 3 is a schematic diagram of one of the pulse generators used in the motor control system of this invention.

SPECIFICATION

Figure 1:
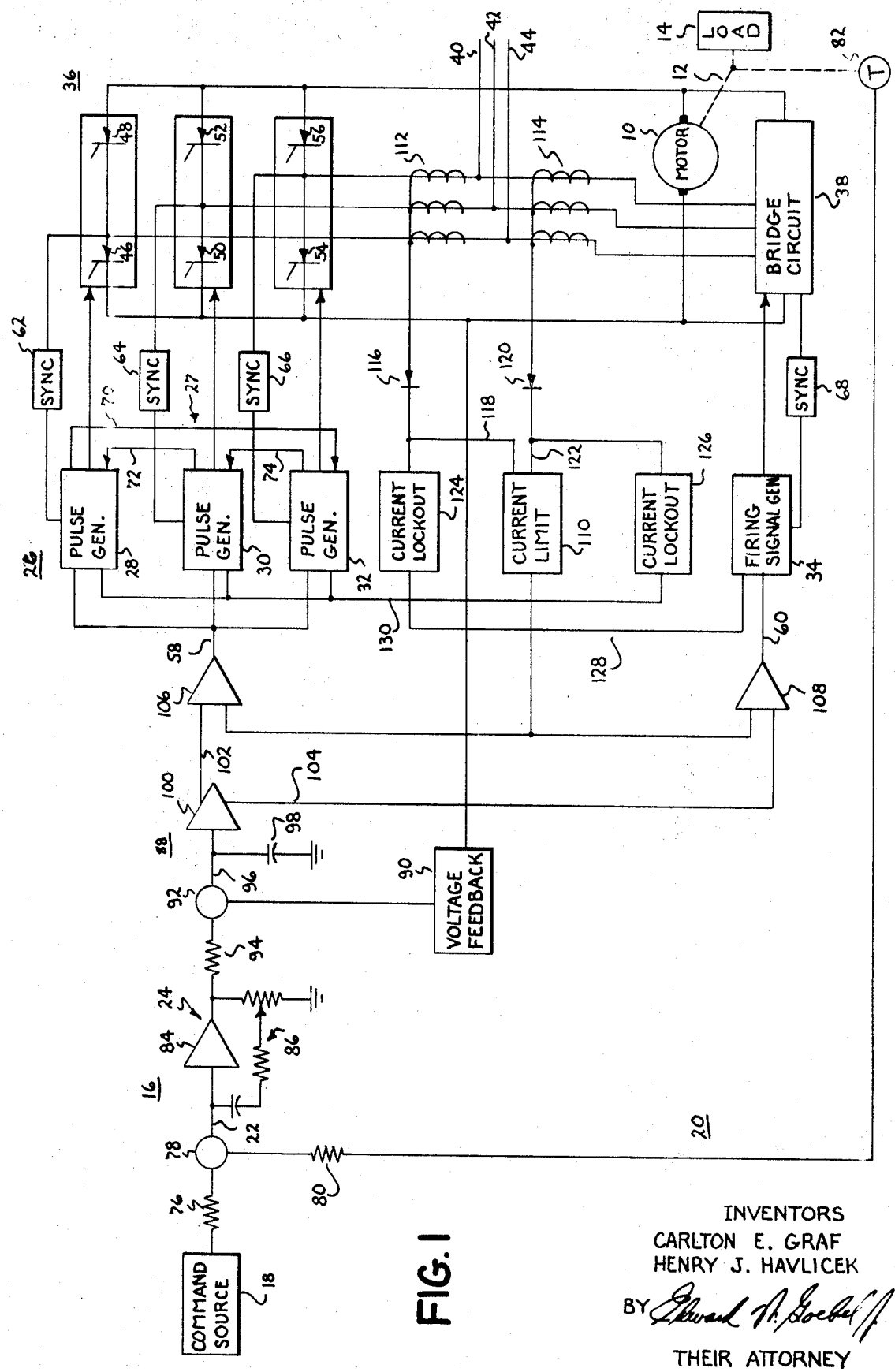
FIG. 1 is a block diagram of a motor control system made in accordance with the principles of this invention.

Referring now in more detail to the drawings, FIG. 1 shows a block diagram of a motor control system including a phase controlled power amplifier in which each of a plurality of controlled rectifiers is fired by a train of pulses. Each of the trains of pulses begins at a phase angle at which the control rectifier to which it is to be coupled is to be fired and lasts during the time period while the controlled rectifier is conducting, approximately 120 electrical degrees. The various pulse generators which provide the firing pulses are interconnected to allow the firing of one of the controlled rectifiers to turn off the pulse generator of another of the controlled rectifiers, preventing the controlled rectifiers from being fired out of turn.

The motor control system of this invention includes a drive motor 10 which, through suitable coupling means 12 drives a load 14. The motor control system basically comprises a regulator 16, a closed loop system which compares reference signals from a command source 18 and feedback signals from a feedback network 20 to produce error signals at a conductor 22 at the input of an operational amplifier 24. The error signals control the firing of controlled rectifiers of a phase controlled power amplifier 26 of the regulator 16 to vary the amount of power coupled from a three-phase alternating-current source to the motor 10.

The power amplifier 26 basically comprises a pair of firing signal generators 27 and 34 for providing firing signals to controlled rectifiers in a pair of bridge circuits 36 and 38. These firing signals cause the controlled rectifiers to begin coupling electrical energy from an alternating-current source, connected to lines 40, 42, and 44, to the drive motor 10.

In accordance with one aspect of this invention, each of the firing signals generators 27 and 34 comprises a plurality of pulse generators, each of which generates a train of pulses for phase-controlled firing of one or more controlled rectifiers in the bridge circuits 36 and 38. The more detailed of these firing signal generators, the generator 27, discloses that each contains three pulse generators, shown as 28, 30, and 32, which generate trains of firing pulses for controlled rectifiers 46 and 48, controlled rectifiers 50 and 52, and controlled rectifiers 54 and 56, respectively, connected to the A-C lines 44, 42, and 40.

As used throughout the specification and in the appended claims, the term "controlled rectifier" stands for devices which present a relatively high blocking impedance until a point of breakdown, at which point they conduct current through a relatively low impedance. Firing signals applied to gate or control electrodes or conductors of these controlled rectifiers are used to determine the point of breakdown. While the man skilled in the art may apply this invention to motor control systems using any of the numerous types of controlled rectifiers, such as thyristors including silicon controlled rectifiers, ignitron and similar tubes, and magnetic devices such as saturable reactors, this invention has been specifically applied to motor control systems using thyristors. With regard to the effects of firing the controlled rectifiers on a load such as the drive motor 10, when the firing is retarded until late in a half-cycle of the applied A-C voltage, a small amount of energy is supplied to the motor. The amount of energy supplied to the motor is increased by advancing the firing of the controlled rectifiers.

The generation of these firing pulses is begun at a phase angle determined by the signal level at conductors 58 and 60. Synchronizing means 62, 64, and 66 provide signals which synchronize the beginning of the pulse trains from the pulse generators 28, 30 and 32 with the A-C voltages applied to the bridge circuit 36. A synchronizing means 68 indicates that the same function is performed for the various pulse generators which comprise the firing signal generator 34.

The controlled rectifiers themselves are fired in a prescribed sequence which causes a balanced direct-current voltage to be applied to the drive motor 10. In further accordance with this invention, each of the pulse trains is terminated when pulses are first generated by a selected one of the other pulse generators, for application to another of the controlled rectifiers. Furthermore, each of the pulse generators is prevented from firing a controlled rectifier until after the controlled rectifier which immediately precedes it in the prescribed sequence has been fired.

To this end, as the pulse generator 28 begins generating its train of pulses, a signal coupled through a conductor 70 both turns off the pulse generator 32 and enables it to respond once again to the signal at the conductor 58. Signals coupled through a conductor 72 turn off the pulse generator 28 as the pulse generator 30 begins generating its pulses, and signals coupled through a conductor 74 turn off the pulse generator 30 as the pulse generator 32 begins its train of pulses.

In one application of this invention, the frequency of the pulse trains was about 10 kHz. when the frequency of the A-C source was 60 Hz. All that is required for this invention is that the frequency of the pulses be substantially higher than that of the source, for example pulses in the frequency range of approximately 5 kHz. to 20 kHz. being satisfactory for a 60 Hz. source. The individual pulses were about 25 microseconds wide and 17.5 volts in magnitude, firing thyristors which controlled the application of a 230-volt or a 460-volt A-C source to the drive motor. Each pulse train was approximately 120 degrees wide and could be shifted over a range of around 150 degrees.

Among the advantages of interconnecting the pulse generators in the manner described is that it lessens the chance that the various controlled rectifiers will be fired out of turn, preventing a seriously unbalanced D-C voltage from being applied to the drive motor 10. Furthermore, by terminating the generation of firing pulses in this manner, a single pulse generator can be used to fire more than one controlled rectifier, in the present embodiment of this invention a pair of controlled rectifiers.

In more detail with regard to the remaining portion of this motor control system, the command source 18 may comprise any convenient means for generating reference signals having a magnitude proportional to the desired performance of the drive motor 10. For example, it may comprise a regulated power supply, a computer, a tachometer generator driven by a master drive system, etc. The reference signals themselves may be reversible in polarity or may have a single polarity, depending on the desired operation of the controlled motor. The reference signals are coupled through a resistor 76 and to a summation point 78.

Negative feedback signals proportional to the regulated characteristic of the drive motor 10 and/or the load 14, are coupled through a resistor 80 in the feedback network 20 to the summation point 78 where they are compared with the reference signals. The summation point 78 stands for any means for comparing reference signals with the negative feedback signals, a resulting error signal being applied to the conductor 22. For illustrative purposes, the regulated characteristic of the system is motor speed, and thus the feedback loop 20 includes a tachometer generator 82 coupled to the drive motor 10 to generate direct-current signals proportional to the speed of this motor. As an alternative, the regulated quantity may be the torque produced by the drive motor 10, the position of the load 14, etc., in each instance requiring an appropriate feedback signal.

In accordance with conventional servo theory, the difference between the current flow through the resistor 76, caused by the reference signals, and the current flow through a resistor 80, caused by the feedback signals, controls the performance of the drive motor 10 by ultimately aiding in the product of actuating signals at the input of the power amplifier 26. The error signals at the conductor 22 are amplified by an amplifier circuit 84 in the operational amplifier 24. An adjustable feedback network 86 of the amplifier 84 responds to high frequency signals which occur at the conductor 22 due to transient operating conditions of the drive system, the network 86 smoothing out the signals to stabilize the motor control system.

A second regulator for the motor control system shown in FIG. 1 comprises a voltage regulator 88 which quickly responds to the need for changing the firing phase angle of the controlled rectifiers of the bridge circuits 36 and 38. This regulator includes a voltage feedback network 90 which provides feedback signals, proportional to the voltage developed across the armature of the motor 10, to a summation point 92. The feedback signals may be provided through the use of a voltage divider (not shown) connected across the armature. The output signals from the amplifier 24 are coupled through a resistor 94 to the summation point 92, where they are compared with the feedback signals to produce an error signal at a conductor 96. The regulator 88 is stabilized by means of a capacitor 98 connected between the conductor 96 at the input of an amplifier 100 and a common point of the motor control system, such as ground.

The motor control system shown in FIG. 1 can reverse the direction of rotation of the motor 10 and has a regenerative mode of operation. One of the pair of bridge circuits 36 and 38 carries current which flows through the motor armature in one direction, while the other carries current which flows through the armature in the opposite direction. By way of example, let us say that the bridge rectifier 36 carries current both while the motor is receiving power from the alternating-current source as the amature rotates in a forward direction and while the motor is operating in its regenerative mode, returning power back to the source as the armature rotates in the reverse direction. The bridge rectifier 38 then carries current both while the motor is receiving power from the source, as the armature rotates in the reverse direction, and while the motor is returning power back to the source as the armature rotates in the forward direction.

The amplifier 100 is a differential amplifier which can provide two outputs to the power amplifier 26: an output signal through a conductor 102 when its error signal input is positive in polarity and an output signal through a conductor 104 when its error signal input is negative in polarity. Output signals at the conductor 102 energize an amplifier 106 to provide signals at the conductor 58 for controlling the firing of the controlled rectifiers in the bridge circuit 36. Output signals at the conductor 104 energize an amplifier 108 to provide signals at a conductor 60 for controlling the firing of the controlled rectifiers in the bridge circuit 38. The average value of the current in the armature circuit of the motor 10 is controlled by a current limit circuit 110, in conjunction with the amplifiers 106 and 108 and the firing signal generators 27 and 34. The current limit circuit responds to means for sensing the instantaneous value of the armature current in the motor 10, such as transformers 112 and 114. When the current is flowing through the bridge circuit 36, signals from the transformer 112 are rectified by a rectifier 116 and are coupled through a conductor 118 to the current limit circuit 110. When the current is flowing through the bridge circuit 38, signals from the transformer 114 are coupled through a rectifier 120 and a conductor 122 to the current limit circuit 110.

The circuit 110 includes means for preventing any of the controlled rectifiers of the bridge circuits 36 and 38 from being fired while the instantaneous value of the armature current remains above a predetermined level. Neither the amplifiers 106 and 108 nor the components between these amplifiers and the controlled rectifiers in the bridge circuits 36 and 38 have a time constant which would prevent an immediate response to the current limit circuit 110. Thus, when the instantaneous value of the armature current is above a predetermined level, none of the then nonconducting controlled rectifiers can be fired. Immediately when the instantaneous value of the armature current decreases below this predetermined level, a forward biased control rectifier is fired which would have been fired but for the operation of the current limit circuit 110. While many types of current limit arrangements can be used in accordance with this invention, a fast acting arrangement such as that described immediately above is preferred. This current limit arrangement is not in itself a part of this invention. It has been described and claimed in patent application Ser. No. 671,775, filed on Sept. 29, 1967, and assigned to the assignee of this invention, which patent application is intended to be incorporated herein by reference.

Current lockout circuits 124 and 126 respond to the current flowing through the bridge circuits 36 and 38, respectively, to prevent current from beginning to flow through one of these bridge circuits while it is still flowing through the other. For example, while the drive motor 10 is rotating in the forward direction and a regenerative mode of operation is required, the current must be switched from the bridge rectifier circuit 36 to the bridge rectifier circuit 38 as the direction of current flow reverses. The lockout circuit 124 prevents the controlled rectifiers in the bridge circuit 38 from being fired while current is still flowing through the controlled rectifiers of the bridge circuit 36. To this end, signals are coupled through a conductor 128 to an input of the firing signal generator 34. Similarly, the current lockout circuit 126 keeps the pulse generators 28, 30 and 32 turned off while current is flowing through the bridge circuit 38 by coupling signals through a conductor 130 to these pulse generators. In this manner, the current lockout circuits prevent any simultaneous firing of controlled rectifiers in the bridge rectifier circuits 36 and 38 which would produce an alternating-current short circuit in the system.

OPERATION OF FIG. 1

The operation of the motor control system shown in FIG. 1 can be best understood by referring to the voltage and current diagrams shown in FIG. 2, and particularly in FIG. 2C which shows a diagram of the pulse voltages applied to the gate electrodes of the controlled rectifiers in the bridge rectifier circuit 36. The individual trains of pulses are marked with the number of the controlled rectifier to which they are coupled.

During the operation of the control system shown in FIG. 1, the regulator 16 controls the speed of the motor 10 by providing error signals at the conductor 22 which are proportional to the difference between the current flow into the summation point 78 from the command source 18 and from the feedback network 20. These error signals, amplified by the operational amplifier 24, aid in producing actuating signals which control the firing of controlled rectifiers in the power amplifier 26. With regard to the voltage regulator 88, at the summation point 92 the output current flow from the operational amplifier 24 is compared with the current flow from the voltage feedback network 90, with the resulting error signal being amplified by the differential amplifier 100 to control the phase angle at which the controlled rectifiers of the bridge circuits 36 and 38 are fired.

Whenever the instantaneous value of the armature current increases above a predetermined level, the current limit circuit 110 prevents any of the then nonconducting controlled rectifiers from being fired. As soon as the instantaneous value of the current decreases below this predetermined level, a forward biased controlled rectifier which would have been fired but for the operation of the current limit circuit 110 is immediately fired. In this manner, say at a time when load is changing or the motor speed is required to increase, increases in armature current level which might damage the controlled rectifiers of the motor itself are prevented.

As pointed out above, using the bridge rectifier circuit 36 as an example, the controlled rectifiers which couple direct-current energy from the A-C source to the motor 10 are fired in a prescribed sequence which is necessary for applying a balanced D-C voltage to the drive motor. Referring now to FIG. 2C as well as FIG. 1, the start of each of the individual train of voltage pulses indicates that the controlled rectifiers of the bridge circuit 36 are fired in the sequence: 46, 56, 50, 48, 54, 52.

Referring to the controlled rectifier 50 as an example, the signal level at the conductor 58 causes the pulse generator 30 to being generating the train of firing pulses at a phase angle represented by a point 132 in FIG. 2C. Just prior to this point, the pulse generator 28 had been coupling a train of firing pulses to the forward biased controlled rectifier 46, while the pulse generator 32 had been coupling a train of firing pulses to the forward biased controlled rectifier 56. In accordance with this invention, at the phase angle represented by the point 132 a signal is coupled through the conductor 72 to the pulse generator 28 to turn it off. Thus the pulse train to the controlled rectifier 46 is terminated at a point 134, while the controlled rectifier 56 continues to receive firing pulses from the pulse generator 32. The conducting controlled rectifiers 50 and 56 now cause the controlled rectifiers 46 to be commutated, terminating the flow of current through this controlled rectifier.

The pulse generator 30 continues to provide pulses at a frequency substantially higher than the frequency of the A-C voltage source, as explained above, until a phase angle represented by a point 136 in FIG. 2C. At this time, the line-to-line voltage applied to the controlled rectifier 54 reaches the phase angle at which this controlled rectifier should be fired. The pulse train coupled to the controlled rectifier 54 begins at a point 138, coinciding with the occurrence of the point 136. A signal coupled through the conductor 74 in FIG. 1 turns off the pulse generator 30 to terminate the train of pulses coupled to the controlled rectifier 50. The controlled rectifier 50 is commutated at this time.

As will be explained below, the pulse generator 30 is unable to couple firing pulses to the controlled rectifier 52 while pulses are being coupled to the controlled rectifier 50. However, the controlled rectifier 52 can be fired at any time after signals from the pulse generator 32 turn off the pulse generator 30, the point of firing being determined by the voltage level at the conductor 58 or the current limit circuit 110.

The duration of each train of firing pulses is the normal conducting period of the controlled rectifier to which it is applied. Should a transient condition in the A-C source voltage cause the controlled rectifier to be commutated prematurely, one of the firing pulses occurring immediately after this transient condition has subsided turns on the controlled rectifier once again. As an added advantage, this train of pulses can be coupled through relatively small sized coupling transformers which isolate the pulse generators from the high voltages on the controlled rectifiers.

FIG. 3 shows a detailed diagram of one of the pulse generators shown in FIG. 1, this being the pulse generator 30 which provides firing pulses for the controlled rectifiers 50 and 52. Common circuit components in FIGS. 1 and 3 are marked with the same numerals.

In the present embodiment of this invention, the circuits between the current limit circuit 110 and the controlled rectifiers of the bridge circuit 36 can respond immediately to requirements for generating or terminating firing signals for the controlled rectifiers. Thus, the amplifier 106 has no time constant. The pulse generator 30 must have the ability to instantaneously respond to changes in the signal level at the output of the amplifier 106. While any type of pulse generator circuit having this ability is satisfactory, one circuit of this type which uses discrete components is disclosed and claimed in a patent application, Ser. No. 583,230, filed on Sept. 30, 1966, entitled "Time Delay Control Circuit," which is intended to be incorporated herein by reference. For illustrative purposes, one embodiment of this circuit is shown in FIG. 3. A man skilled in the art can substitute other circuits, such as those made with integrated circuit techniques which perform the same functions.

The pulse generator circuit 30 includes a unijunction transistor 140 having its base two electrodes connected through a resistor 142 to a source of positive potential, regulated voltage. The base one electrode of this transistor is connected through a resistor 144 to a common point for the circuit. The unijunction transistor 140 is fired, decreasing the impedance between its base one electrode 143 and its emitter electrode 146 when the voltage across these electrodes is a certain percentage of the voltage applied across the base two and base one electrodes, called the intrinsic stand-off ratio. For example, if the intrinsic stand-off ratio of the unijunction transistor 140 is 60% and the voltage from the base two electrode to the base one electrode is 20 volts, when the voltage across the emitter electrode 146 and the base one electrode 143 is 12 volts, unijunction transistor 140 is fired. At this time, an output signal is developed across the resistor 144, which causes one of the controlled rectifiers 54, 52 to be fired.

In the present circuit, the unijunction transistor 140 is fired by the combination of a timing voltage, developed across a capacitor 148, and the control or platform voltage developed across a resistor 150 by the output of the amplifier 106. The capacitor 148 is charged by current flowing from the positive voltage source and through a resistor 152, a diode 154 and the resistor 150 to the common terminal of the circuit. The sum of the voltages across the capacitor 148 and the resistor 150 is coupled through a diode 156 to the emitter electrode 146 and through the resistor 144 to base one electrode 143. The sum of the timing voltage and the platform voltage is compared with the voltage across the base two and the base one electrodes of the transistor 140.

The combination of a capacitor 158 and a transistor 160 provides an auxiliary energy source which can be charged independently of the timing capacitor 148 without initiating the firing of the unijunction transistor 140. The transistor 160 is connected in an emitter-follower configuration whereby the capacitor 158 is charged through this transistor, a resistor 162, and a diode 164 to a voltage level just below that developed across the capacitor 148 and the resistor 150. A diode 166 connects the capacitor 158 to the emitter 146. Should the unijunction transistor 140 be turned on while there is only a small charge across the capacitor 148, due to a large platform voltage across the resistor 150, the capacitor 158 can be discharged through the diode 166 to assure that the firing pulses are developed across the resistor 144.

A capacitor 168 is provided, to temporarily delay the effects of the application of the platform voltage to the timing circuit when this voltage is first applied during a timing cycle. A resistor 170 comprises a charging path for the capacitor 168, while a diode 172 allows the platform voltage to be removed from the timing circuit. A conductor 174 couples the junction of the capacitor 168, the resistor 170, and the cathode of the diode 172 to logic circuitry 176 which controls the generation of the pulse trains for the controlled rectifiers 50 and 52. The logic circuitry 176 synchronizes the pulse trains with the A-C voltages applied to these controlled rectifiers and limits their duration to approximately 120 electrical degrees, terminating them at the start of a pulse train for another controlled rectifier. This logic circuitry comprises selection circuits 178, which respond to synchronizing input signals coupled through conductors 180 and 182 from the A-C line, to determine which of the controlled rectifiers 50 and 52 receives a train of pulses. A conductor 184 is connected to the base two electrode of the transistor 140 to indicate that the selection circuits 178 synchronize the generation of firing pulses with the A-C supply voltages by discharging the timing capacitor 148 every 180 electrical degrees.

The signals at a conductor 186 are coupled through an amplifier and gate circuit 188 and from there through a conductor 190 to a modulator circuit 192. A conductor 194 couples a positive feedback signal to the input of the gate circuit 188 to keep it turned on until a turn-off signal is received from the output of a similar gate circuit for the controlled rectifier 54 of FIG. 1. This turn-off signal is coupled through a conductor 196 to the gate circuit 188. When the gate circuit 188 is first turned on, a turn-off signal is coupled through a conductor 198 at its output to the gate circuit for the controlled rectifier 46 of FIG. 1.

A signal at a conductor 200 is coupled through an amplifier and gate circuit 202 and through a conductor 204 to a modulator 206. A conductor 208 provides a positive feedback signal at the input of the gate circuit 202 to keep it turned on until a conductor 210 receives a turn-off signal from the gate circuit for the controlled rectifier 56 of FIG. 1. At a start of an output signal from the gate circuit 202, a signal is coupled through a conductor 211 to the gate circuit for the controlled rectifier 48 of FIG. 1.

Both of the gate circuits 188 and 202 remain turned off, preventing the generation of pulse trains for the controlled rectifiers 50 and 52, while they receive a lockout signal from the conductor 130 and diodes 212 and 214. A pair of diodes 216 and 218 and their associated gate circuits, energize the diode 172 to prevent the platform voltage across resistor 150 from being applied in series with capacitor 148 until 60 electrical degrees before the actual firing time. This prevents the controlled rectifiers from being fired too early or out of sequence. Normally, the capacitor 168 is charged by the platform voltage, as well as by current flowing through resistor 170. During current limit, the capacitor 168 is charged solely by current flowing through the resistor 170. Signals through the diodes 216 and 218 can prevent the platform voltage from affecting the pulse generation.

A free running oscillator 217 is connected to the modulators 192 and 206. Whenever these modulators are turned on, the pulses from this oscillator 217 make up the pulse train which is fed through pulse transformers 220 and 221 to the gate circuits of the controlled rectifiers 50 and 52.

THE OPERATION OF FIG. 3

The operation of FIG. 3 can be best understood by referring to FIG. 2, and especially to FIGS. 2A and 2B, which show the wave shape of the current of the motor 10 in FIG. 1 and the voltage level at the anode of the diode 156 in FIG. 3, respectively.

Referring now to FIG. 2B and FIG. 3, the selection circuits 178 synchronize the generation of firing pulses with the voltage applied to the controlled rectifiers 50 and 52 by discharging the timing capacitor 148 every 180 electrical dergees and causing it to begin charging once again, say at points 222 and 224 of FIG. 2B. At this time, the gate circuit 202 is turned on so that pulses are coupled through the modulator 206 and the transformer 221 to the controlled rectifier 52. When the controlled rectifier 56 is turned on, say at a point 226 in FIG. 2C, a signal coupled through the conductor 210 turns off the gate circuit 202 to terminate the train of output pulses coupled to the controlled rectifier 52.

With the gate circuit 202 turned off, the diodes 218 and 172 no longer clamp the platform voltage out of the timing circuit. Thus, at a point 228 of FIG. 2B, coinciding with the point 226, the platform voltage begins to very quickly charge the capacitor 168 of FIG. 3. At a phase angle determined by a platform voltage level, the sum of the platform voltage across the resistor 150 and the timing voltage developed across the capacitor 148 reaches the breakdown level of the unijunction transistor 140. The capacitor 148 and the capacitor 158 are discharged through the resistor 144. The selection circuits 178 now cause an output signal to be coupled through the conductor 186 to turn on the gate circuit 188. A train of firing pulses is then coupled from the modulator 192 and through the transformer 220 to the controlled rectifier 50. Turn off signals are coupled through the conductor 198 to the pulse generator 28 of FIG. 1 to turn off the firing pulses to the controlled rectifier 46.

FIG. 2A shows the wave shape of the D-C output current applied to the drive motor 10 of FIG. 1. The solid line curve shows the current wave shape without the influence of the current limit circuit 110. The dotted line curve shows the effects of this current limit circuit on the wave shape after the instantaneous value of the current increases above a predetermined current value shown as a line 230.

To fire the controlled rectifier 52 during current limit, the capacitor 148 of FIG. 3 begins charging at a point 224 of FIG. 2B. The platform voltage is momentarily applied to the unijunction timing circuit of FIG. 3 at a point 232 of FIG. 2B, coinciding with the point 138 of FIG. 2C. A signal from pulse generator 32, which has begun firing the controlled rectifier 54, has turned off the pulse generator 30 as the controlled rectifier 50 is commutated, allowing the capacitor 168 to begin being charged by the platform voltage from amplifier 106. The current limit circuit now turns off the amplifier 106 as the instantaneous current level rises above the value set by line 230 of FIG. 2A, at a point 234 of FIG. 2A.

The voltage at the anode of diode 156 of FIG. 3 decreases to the level of the voltage across capacitor 148, as the diode 172 isolates the capacitor 168 from the unijunction timing circuit itself. The capacitor 168 continues to charge through the resistor 170, as indicated by the dotted line in FIG. 2B.

The instantaneous value of the current decreases below the level indicated by the line 230 at a point 236 of FIG. 2A. The current limit circuit 110 in FIG. 3 is turned off. The amplifier circuit 106 immediately applies the platform voltage across the resistor 150. Since the capacitor 168 has been previously charged, the unijunction transistor 140 turns on at a point 238 in FIG. 2B, the gate circuit 202 is turned on, and firing pulses are coupled through the modulator 206 and the transformer 221 to fire the controlled rectifier 52.

This invention is not limited to the particular details of the preferred embodiments illustrated. It is contemplated that many variations, modifications, and applications of this invention will occur to those skilled in the art. It is therefore intended that the appended claims cover these variations, modifications, and applications which do not depart from the true spirit and scope of this invention.

What we claim as new and desire to secure by Letters Patent of the United States is:

1. A motor control system comprising drive motor means; first, second, and third controlled rectifier means for coupling electrical energy from first, second, and third lines, respectively, of a three-phase, alternating-current source to said motor; regulator means responsive to reference signals from a command source and feedback signals from a feedback network for providing actuating signals which control the firing phase angles of said controlled rectifier means; the improvement comprising pulse generator means for providing a separate train of firing pulses, having a frequency substantially higher than the frequency of said source, to each of said controlled rectifier means, each of the trains of pulses beginning at the firing phase angle of each of said controlled rectifier means and terminating at the end of a conduction period of each of said controlled rectifier means, said pulse generating means comprising, in combination:
   (a) a first pulse generator responsive to said regulator means and to the voltage applied to said first controlled rectifier means for applying a train of pulses to said first controlled rectifier means at the firing phase angle of the voltage forward biasing said first controlled rectifier means;
   (b) a second pulse generator responsive to said regulator means and to the voltage applied to said second controlled rectifier means for applying a train of pulses to said second controlled rectifier means at the firing phase angle of the voltage forward biasing said second controlled rectifier means;
   (c) a third pulse generator responsive to said regulator means and to the voltage applied to said third controlled rectifier means for applying a train of pulses to said third controlled rectifier means at the firing phase angle of the voltage forward biasing said third controlled rectifier means;
   (d) means responsive to the initial application of firing pulses to said second controlled rectifier means for turning off said first pulse generator;
   (e) means responsive to the initial application of firing pulses to said third controlled rectifier means for turning off said second pulse generator; and
   (f) means responsive to the initial application of firing pulses to said first controlled rectifier means for turning off said third pulse generator.

2. An improved motor control system according to claim 1 including free-running oscillator means for providing the pulses for the trains of pulses; each of said pulse generators including a timing circuit which responds to said regulator means to determine the firing phase angles of their respective controlled rectifier means and each of said pulse generators including means responsive to the output of said timing circuit for coupling pulses from said oscillator to said controlled rectifier means.

3. An improved motor control system according to claim 2 wherein said controlled rectifier means comprise full-wave circuit means for coupling electrical energy from each line of said source to said motor and provides means responsive to first signals from the alternating-current source for firing said controlled rectifier means during one half-cycle of the voltage from the source and responsive to second output signals from the alternating-current source for firing said controlled rectifier means during the other half-cycle of the voltage from the source.

4. An improved motor control system according to claim 1 in which each of said first, second, and third controlled rectifier means comprises a pair of controlled rectifiers, said controlled rectifiers being connected in a full wave bridge circuit; each of said pulse generators including means for causing it to provide a separate train of pulses for each of its controlled rectifiers with each of the trains of pulses beginning at a firing phase angle of one of said controlled rectifiers.

5. An improved motor control system according to claim 4 including means for preventing the actuating signals from affecting a timing circuit in any one of said pulse generators while this pulse generator is providing firing pulses to one of said controlled rectifiers.

6. A motor control system comprising, in combination:
(a) direct-current drive motor means;
(b) power amplifier means including a three phase circuit comprising controlled rectifiers for applying direct-current electrical energy from a three phase, alternating-current source to said drive motor;
(c) first means for applying actuating signals to said power amplifier, said first means including regulator means which combines reference signals from a command source and feedback signals from a feedback source to aid in producing the actuating signals;
(d) said power amplifier means including second means responsive to the actuating signals for providing firing signals which fire controlled rectifiers in said three phase circuit in a prescribed sequence which is necessary for applying a balanced direct-current voltage to said drive motor; and
(e) means responsive to the firing of said controlled rectifiers for preventing each of said controlled rectifiers from being fired until after the firing of the controlled rectifier which immediately precedes it in the prescribed sequence.

7. A motor control system according to claim 6 wherein said second means includes phase control firing circuits and said means for preventing each of said controlled rectifiers from being fired include means for preventing said phase control firing circuits from causing firing signals to be coupled to said controlled rectifier.

8. A motor control system according to claim 6 which includes first, second, and third pulse generators for applying trains of pulses to controlled rectifiers connected to the first, second, and third phases, respectively, of the three phase alternating current source and includes means responsive to the initial application of firing pulses by said second pulse generator for turning off said first pulse generator and means responsive to the initial application of firing pulses by said third pulse generator for turning off said second pulse generator and means responsive to the initial application of firing pulses by first pulse generator for turning off said third pulse generator.

9. A motor control system according to claim 8 which also includes means for periodically synchronizing the generation of firing pulses with the alternating-current voltage of the source and includes separate controlled rectifier means for coupling electric current through said motor in a first direction and separate controlled rectifier means for coupling electric current through said motor in a second direction, said motor control system further including means for preventing the controlled rectifiers of one of said controlled rectifier means from being fired while the controlled rectifiers in the other of the controlled rectifier means are being fired.

10. A control system for controlling electrical energy coupled from first, second, and third lines, of a three phase alternating-current source to a load, including first, second, and third controlled rectifier means coupled to the line and means for providing actuating signals for controlling the firing phase angles of said controlled rectifier means; and the improvements comprising pulse generator means for providing a separate train of pulses, having a frequency substantially higher than the frequency of the source, to each of said controlled rectifier means, each of the trains of pulses beginning at the firing phase angle of each of said controlled rectifier means and terminating at the end of a conduction period of each of said controlled rectifier means, said pulse generating means comprising, in combination:
(a) a first pulse generator responsive to said regulator means and to the voltage applied to said first controlled rectifier means for applying a train of pulses to said first controlled rectifier means at the firing phase angle of the voltage forward biasing said first controlled rectifier means;
(b) a second pulse generator responsive to said regulator means and to the voltage applied to said second controlled rectifier means for applying a train of pulses to said second controlled rectifier means at the firing phase angle of the voltage forward biasing said second controlled rectifier means;
(c) a third pulse generator responsive to said regulator means and to the voltage applied to said third controlled rectifier means for applying a train of pulses to said third controlled rectifier means at the firing phase angle of the voltage forward biasing said third controlled rectifier means;
(d) means responsive to the initial application of firing pulses to said second controlled rectifier means for turning off said first pulse generator;
(e) means responsive to the initial application of firing pulses to said third controlled rectifier means for turning off said second pulse generator; and
(f) means responsive to the initial application of firing pulses to said first controlled rectifier means for turning off said third pulse generator.

11. A control system according to claim 10 which includes means for preventing the actuating signals from causing pulses to be coupled from a pulse generator to one of said controlled rectifiers while this pulse generator is providing firing pulses to another of said controlled rectifiers.

12. A control system according to claim 10 wherein each of said first, second, and third controlled rectifier means includes a pair of series connected controlled rectifiers and each of said pulse generators includes means for providing a separate train of pulses for each of said pair of controlled rectifiers, with each of the trains of pulses beginning at the firing phase angle of one of said pair of controlled rectifiers.

13. In a circuit for controlling the power supplied from a three phase, alternating-current source to a load, the combination comprising:
(a) a three phase, controlled rectifier circuit for coupling power from the three phase alternating-current source to the load;
(b) first means for generating actuating signals to control the amount of power supplied to the load;
(c) second means connected to said first means and responsive to the actuating signals for providing firing signals which fire said controlled rectifiers in a prescribed sequence; and
(d) means responsive to the firing of said controlled rectifiers for preventing each of said controlled rectifiers from being fired until after the firing of the controlled rectifier which immediately precedes it in the prescribed sequence.

14. A circuit according to claim 13 wherein said controlled rectifier circuit includes separate controlled rectifiers for coupling electric current through the load in a first direction and separate controlled rectifiers for coupling electric current through the load in a second direction, and further includes means for preventing controlled rectifiers which couple current in one direction from being fired while the controlled rectifiers which couple current in the other direction are being fired.

15. A circuit according to claim 13 wherein said second means includes phase control firing circuits and said means for preventing each of said controlled rectifiers from being fired include means for preventing said phase control firing circuits from causing firing signals to be coupled to said controlled rectifiers; said circuit also including means for periodically synchronizing the operation of said phase control firing circuits with the alternating-current voltage of the source.

16. A circuit according to claim 13 wherein the firing signals are provided by a pulse generator which supplies a separate train of firing pulses having a frequency substantially higher than the frequency of the alternating-current source to each controlled rectifier of said controlled rectifier circuit and said circuit further includes regulator means which combine reference signals from a command source and feedback signals representing a desired condition of the load to aid in controlling the application of the trains of pulses to said controlled rectifiers.

References Cited

UNITED STATES PATENTS

| | | | |
|---|---|---|---|
| 2,989,676 | 6/1961 | Fischer | 318—345 |
| 3,181,046 | 4/1965 | Sutton | 318—207 XR |
| 3,089,992 | 5/1963 | Seney | 318—171 |
| 3,332,000 | 7/1967 | Greening et al. | 318—345 |
| 3,345,549 | 10/1967 | Hauser et al. | 318—227 |
| 3,355,647 | 11/1967 | Braus | 318—227 XR |
| 3,413,534 | 11/1968 | Stringer | 318—326 XR |

ORIS L. RADER, Primary Examiner

G. Z. RUBINSON, Assistant Examiner

U.S. Cl. X.R.

318—257, 326; 321—5